Nov. 11, 1947.  G. RODINGER  2,430,783
FOOD TRAY
Filed April 2, 1945  2 Sheets-Sheet 1
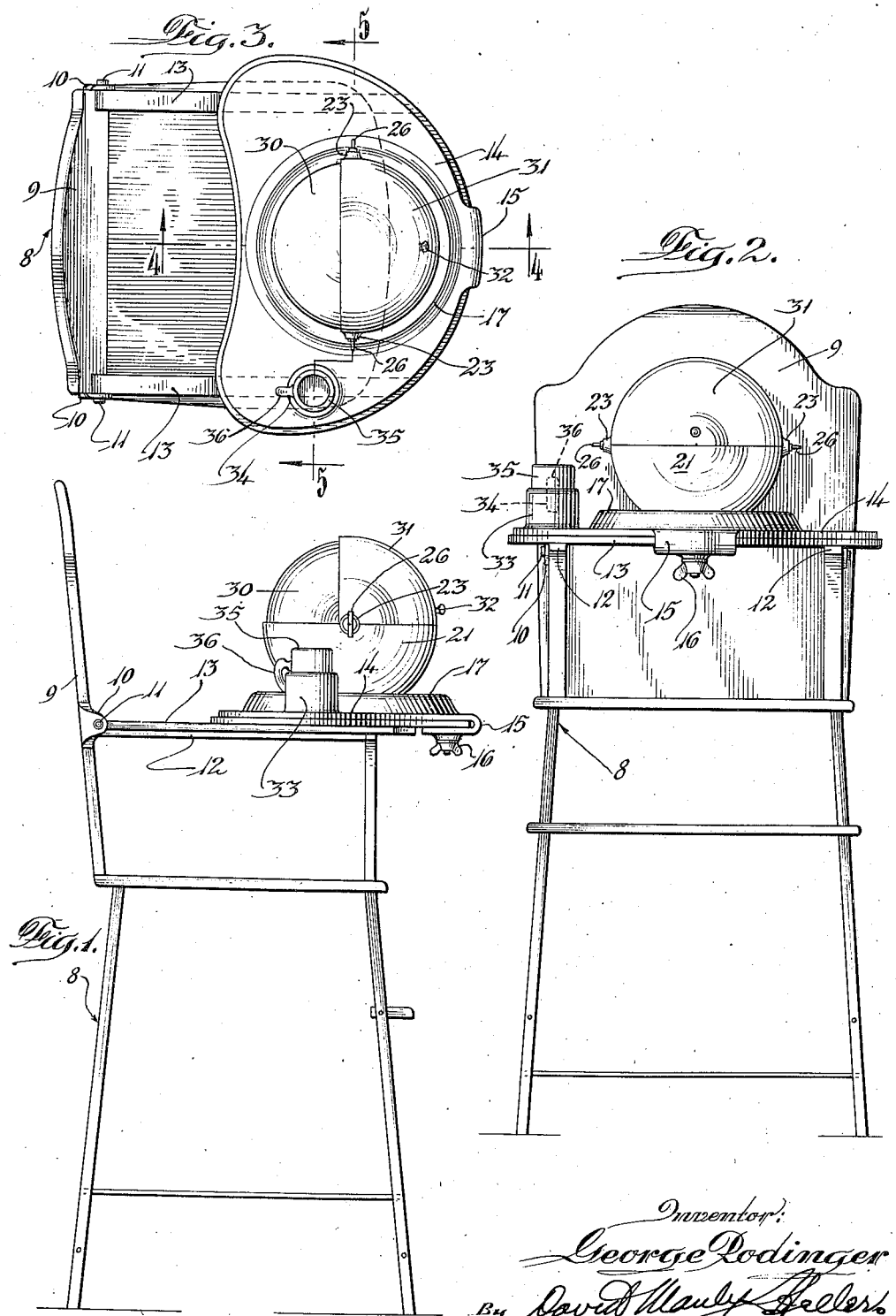
Inventor:
George Rodinger
By David Mauly Sellers
Attorney.

Nov. 11, 1947.  G. RODINGER  2,430,783
FOOD TRAY
Filed April 2, 1945  2 Sheets-Sheet 2
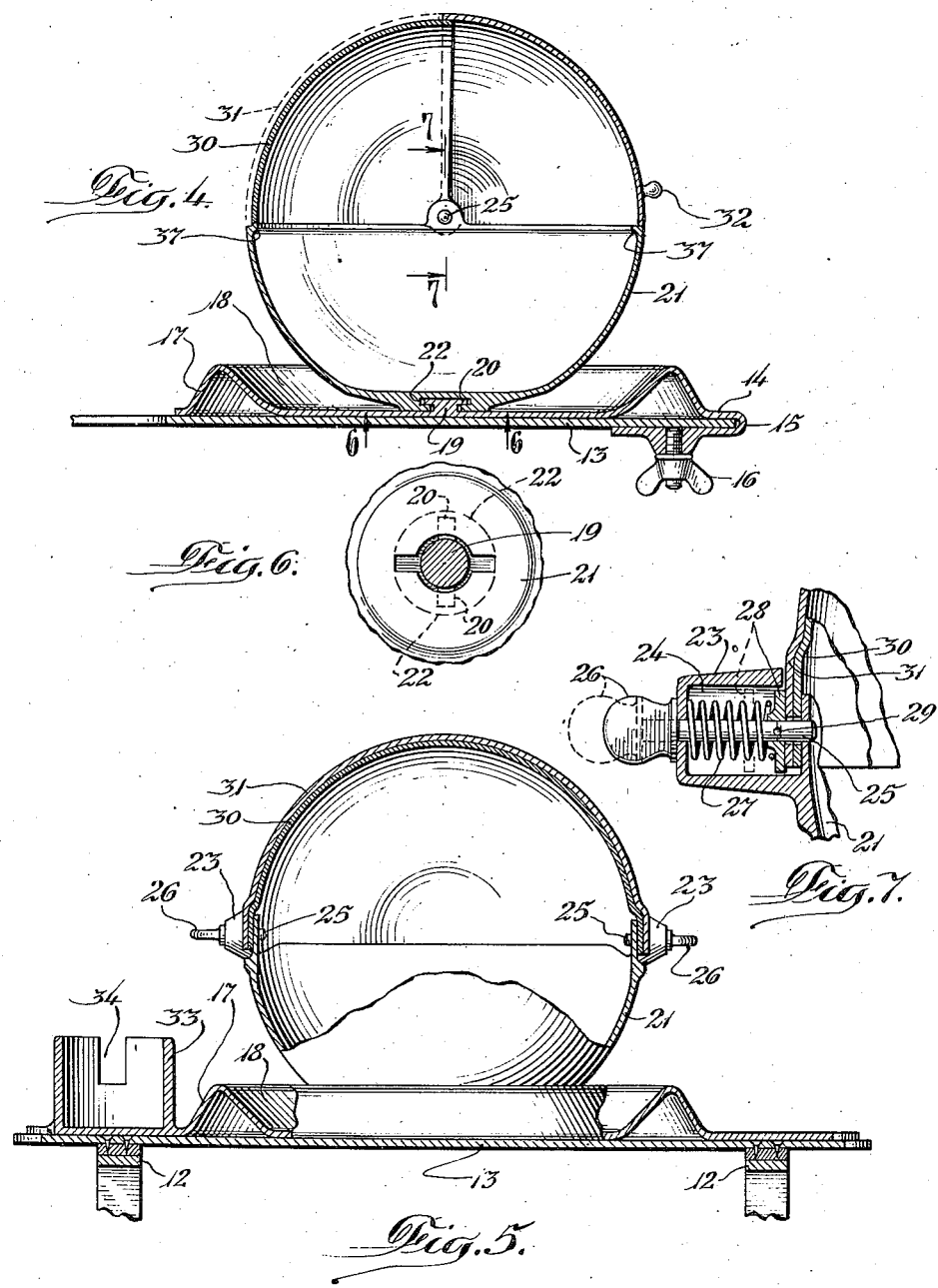

Patented Nov. 11, 1947

2,430,783

UNITED STATES PATENT OFFICE 2,430,783

FOOD TRAY

George Rodinger, Chicago, Ill.

Application April 2, 1945, Serial No. 586,158

5 Claims. (Cl. 65—53)

My invention appertains to feeding trays, or devices of similar character, which are used for feeding children usually occupying high chairs or similar structures.

One object of my invention is to provide a tray which is removably attachable to the apron or table of a high chair structure, and which has incorporated therein a plate-like recess and means for removably attaching a bowl; the said bowl being provided with protective guard means which will prevent the child from tampering with or spilling food or contents in the bowl, so that the child may be fed by an adult without danger of the child spilling, or messing up, or breaking the dish in which the food is contained.

Another object of my invention is to provide on the bowl, removable guard means which may be instantly attached to the said bowl or removed therefrom.

Another object of my invention is to provide in an article of the aforementioned character, means for supporting and retaining removably a tumbler, or a cup.

Another object of my invention is to provide a device of the aforementioned character which is practical and efficient for the purposes for which it has been designed and constructed, and an article also which is of such simple elemental structure that it may be manufactured economically in quantity production.

Other features and objects inherent in my invention will become apparent from an examination of the accompanying drawing having particular reference to the ensuing description, wherein like symbols are used to designate like parts, and in which:

Fig. 1 represents a side view of a high chair with my invention attached thereto.

Fig. 2 is a front view of Figure 1.

Fig. 3 is a top view of Figure 1.

Fig. 4 is an enlarged longitudinal cross-sectional view taken, substantially, on the line 4—4 of Figure 3.

Fig. 5 is a cross-sectional view taken, substantially, on the line 5—5 of Figure 3.

Fig. 6 is a view showing a bayonet locking structure utilized in connection with my invention, as viewed on the line 6—6 of Figure 4.

Fig. 7 is an enlarged, and fragmentary sectional view, showing the spring urged mechanism utilized for removably attaching the guard means to the bowl used in the structure of my invention, it being a sectional view taken, substantially, on the line 7—7 of Figure 4.

Referring to the various views, 8 generally, designates a high chair having a back support 9 and a seat upon which a child is supported, and is provided with an arm rest 12 which supports the articulated apron 13 provided with a suitable supporting platform, the said apron 13 being articulately secured by pivot means 11 to the lugs 10 of the back 9.

The invention proper consists of a tray shaped approximately to the configuration shown and designated 14, which is provided with a bent over flange portion 15 so as to permit securing the same removably by means of thumb screw 16 to the apron structure 13 heretofore mentioned.

The tray 14 is made of suitable sheet metal or plastic material and has formed therein a structure of plate-like configuration 17 in the well 18 of which various articles of food may be deposited such as meats, vegetables, fruits etc., the said tray or plate-like structure 17 being provided at its midpoint with a shank or stud 19, having two heads 20 so as to mate with the key-hole locking slot 22 in the bowl 21, thus the bowl 21 may be secured to the plate-like structure 18 removably by means of rotating the same approximately one half turn clock-wise or counterclock-wise as conditions may necessitate.

The bowl is provided with a recessed ledge portion 37 at its top so as to provide a retaining lip for the hemispherical guard means, made of two component elements 30 and 31, articulately secured to one another at the lugs 23, so that, when the guards are in the position shown in Figure 4, the contents within the bowl, if hot, will be maintained hot. The guard 31 is provided with a handle or manipulating button 32 so that the same may be moved in the direction of the arrow and brought to the dotted line position indicated in Figure 4, in which case an opening is provided for the adult to have access to the food contents within the bowl so as to feed a child with a spoon or fork, or as feeding conditions may require.

The guard 31 when superimposed on the guard 30 forms a protecting cover in front of the child, so that the child may not be able to tamper with the contents of the bowl, and will not be able to place the hand therein, or spoons or other eating utensils, thus tending to spill the contents, or to create a rather messy and undesirable situation during feeding time.

The tray structure is also provided with a cup-like cylindrical support 33 which has an open end recess 34 therein so as to accommodate a tumbler or cup 35, the slot 34 providing ample clearance for the handle 36 of a cup.

The bowl is provided with two housings 23, having recesses or bores, or pockets 24 therein, and being suitably drilled to receive the pin 25 which is secured to a flange 28 by means of pin 29, a spring 27 being confined between the said flange 28 and the bottom of the support or housing 23. The opposite end of the pin 25 has connected thereto a manipulating handle 26, while the guards 30 and 31 are bored out suitably to operate articulately on the extremities of the pin 25 as shown in full lines in the view Figure 7. When it is desired to remove the guards 30 and 31, the handles 26 are pulled outwardly to the dotted position, simultaneously, thus removing the ends of the pins 25 from the seating holes in the guards 30 and 31 permitting the same to be lifted off and put aside when not needed, or when not in use.

When feeding a child, the cover 31 is placed in the dotted position so as to provide access to the bowl. When the bowl is not being used, it is removed from engagement with the double-headed structure thus providing the plate-like structure 18 for food which may be conveniently placed therein and fed to the child.

I believe, I have, herein, described rather succinctly the nature and operation as well as the construction of the invention which I have produced, and inasmuch as the same is susceptible of modifications and improvements, I reserve the right to all modifications and improvements coming within the scope and spirit of my invention, also any modifications and improvements which may be embodied in the accompanying drawings, as well as all those lying within the purview of the foregoing description.

Having thus described and revealed my invention, what I claim as novel and desire to secure by Letters Patent is:

1. A food tray having a plate-like recess formed therein, a double-headed stud at the center of the said plate-like recess, the said food tray also provided with a clamping lug, clamping means secured to said clamping lug adapted to secure the said food tray removably to a support, a bowl having a key-hole slot at its bottom adapted to be secured removably to the said double-headed stud, the said bowl provided with spring urged retaining means diametrically opposed adjacent its upper lip portion, and duplex guard means articulately and removably secured to the said spring urged retaining means.

2. A food tray having a plate-like recess formed therein, a double-headed stud at the center of the said plate-like recess, the said food tray also provided with a clamping lug, clamping means secured to said clamping lug adapted to secure the said food tray removably to a support, a bowl having a key-hole slot at its bottom adapted to be secured removably to the said double-headed stud, the said bowl provided with spring urged retaining means diametrically opposed adjacent its upper lip portion, and duplex guard means articulately and removably secured to the said spring locking means, the said guard means being substantially hemispherical in configuration and subdivided into two overlapping spherical triangles of a magnitude exceeding 90°.

3. A food tray having a plate-like recess formed therein, a double-headed stud at the center of the said plate-like recess, the said food tray also provided with a clamping lug, clamping means secured to said clamping lug adapted to secure the said food tray removably to a support, and a bowl having a key-hole slot at its bottom adapted to be secured removably to the said double-headed stud, the said food tray further provided with a hollow cylindrical housing of lesser length than the height of a receptacle to be retained therein, the said cylindrical housing having an open slotted portion on its wall to clear the handle of said receptacle.

4. A food tray having a plate-like recess formed therein, a double-headed stud at the center of the said plate-like recess, the said food tray also provided with a clamping lug, clamping means secured to said clamping lug adapted to secure the said food tray removably to a support, a bowl having a key-hole slot at its bottom adapted to be secured removably to the said double-headed stud, the said bowl provided with spring urged retaining means diametrically opposed adjacent its upper lip portion, and duplex guard means articulately and removably secured to the said spring urged retaining means, the said food tray further provided with a hollow cylindrical housing of lesser length than the height of a receptacle to be retained therein, the said cylindrical housing having an open slotted portion on its wall to clear the handle of said receptacle.

5. A food tray having a plate-like recess formed therein, a double-headed stud at the center of the said plate-like recess, the said food tray also provided with a clamping lug, clamping means secured to said clamping lug adapted to secure the said food tray removably to a support, a bowl having a key-hole slot at its bottom adapted to be secured removably to the said double-headed stud, the said bowl provided with spring-urged retaining means diametrically opposed adjacent its upper lip portion, and duplex guard means articulately and removably secured to the said spring locking means, the said guard means being substantially hemispherical in configuration and subdivided into two overlapping spherical triangles of a magnitude somewhat over 90°, the said food tray further provided with a hollow cylindrical housing of lesser length than the height of a receptacle to be retained therein, the said cylindrical housing having an open slotted portion on its wall to clear the handle of said receptacle.

GEORGE RODINGER.

REFERENCES CITED

The following references are of record in the file of this patent:

UNITED STATES PATENTS

| Number | Name | Date |
| --- | --- | --- |
| 76,639 | Lawrence | Apr. 14, 1868 |
| 78,366 | Fenn | May 26, 1868 |
| 208,807 | Gillard | Oct. 8, 1878 |
| 407,477 | Ezell | July 23, 1889 |
| 433,977 | Carpenter | Aug. 12, 1890 |
| 949,025 | Matthews | Feb. 15, 1910 |
| 1,242,785 | Eldridge | Oct. 9, 1917 |
| 1,267,098 | Mattson | May 21, 1918 |
| 1,876,264 | Tucker | Sept. 6, 1932 |
| 2,187,426 | Kühnel | Jan. 16, 1940 |

FOREIGN PATENTS

| Number | Country | Date |
| --- | --- | --- |
| 1,110 | Great Britain | Apr. 16, 1870 |
| 26,554 | Great Britain | Nov. 19, 1913 |